United States Patent [19]

Yokota

[11] Patent Number: 5,076,645
[45] Date of Patent: Dec. 31, 1991

[54] ARMREST FOR VEHICLE SEAT

[75] Inventor: Masaaki Yokota, Akishima, Japan
[73] Assignee: Tachi-S Co., Ltd., Tokyo, Japan
[21] Appl. No.: 587,674
[22] Filed: Sep. 25, 1990
[51] Int. Cl.[5] ............................ A47C 7/54; B60N 2/44
[52] U.S. Cl. ................................ 297/417; 74/97.1; 297/113
[58] Field of Search ............ 297/417, 411, 115, 116, 297/113; 74/97.1

[56] References Cited

U.S. PATENT DOCUMENTS

| 4,621,864 | 11/1986 | Hill | 297/115 |
|---|---|---|---|
| 4,655,501 | 4/1987 | Ishigami et al. | 297/113 |
| 4,872,727 | 10/1989 | Rye | 297/417 |
| 4,902,072 | 2/1990 | Chancellor, Jr. | 297/115 |
| 4,946,226 | 8/1990 | Hurn et al. | 297/417 |

Primary Examiner—Laurie K. Cranmer
Assistant Examiner—Cassandra L. Hope
Attorney, Agent, or Firm—Oldham & Oldham Co.

[57] ABSTRACT

An armrest for a vehicle seat, wherein armrest is rotatable between a use position for supporting an arm of an occupant and non-use position where the armrest body stands upright along the vertical direction of the seat back of the seat, under the force of a return spring, and wherein there is arranged a buffer means for reducing a rotation rate at which the armrest is rotated downwardly to the non-use position. Thus, the armrest body may be rotated at a moderate rate towards the non-use position, thereby avoiding a serious collision of the armrest body against a part of the vehicle.

6 Claims, 2 Drawing Sheets

ARMREST FOR VEHICLE SEAT

BACKGROUND OF THE INVENTION

1. Field of the Invention

The present invention relates to an armrest for use in such a vehicle seat as an automotive seat, and in particular is directed to the one of the vertically rotatable type wherein the armrest is free to rotate between a non-use position where it stands upright along the lateral side of seat back of the seat and a use position where it lies horizontally for receipt of an occupant's arm.

2. Description of Prior Art

Conventionally, by and large, most of the vertically rotatable armrest utilizes a spring means for urging the armrest body to one of use and non-use positions and resiliently holding it there, the use position being defined hereby as a position in which the armrest lies horizontally, projecting forwardly relative to the seat back of a seat, and the non-use position being defined hereby as a position in which the armrest is in the state of being stood generally upright along the vertical lateral side of the seat back.

The displacement of such spring-based armrest between the use and non-use position is effected in relation to a dead point, which is hereby defined to be a point disposed at a center line between the use and non-use position, where the force of the spring is not active or turned to zero as it appears and does not act on the armrest to rotate to wards either of the non-use and use positions. In other words, when rotating the armrest downwardly below the dead point towards the use position, the armrest is urged to rotate donwwardly by virtue of the pulling force of the spring and its own weight without adding any further force thereupon, or when rotating the armrest upwardly above the dead point towards the non-use position, the armrest is to be rotated with a force overcoming the force of the spring until the dead point and beyound the dead point, the armrest is automatically forced into the non-use position under the pulling force of the spring without applying any further force to the armrest.

Thus, the above spring-based armrest displays what can be called a "semi-automatic" operation for displacement between the use and non-use positions when the armrest passes by such dead point.

However, it has been perceived as a drawback in this kind of armrest that, the armrest body, when being rotated down below the dead point, is so quickly forced down as to cause a serious collision between the relevant part and a stopper within the body. In particular, in the case of such armrest being mounted on the front seat, with a console box being disposed along the lateral side of the front seat, the armrest will be driven into a strong crush with the console box, emitting an unpleasant noize. As a result, such aspect has been disadvantageous for use by an occupant.

SUMMARY OF THE INVENTION

In view of the above-discussed drawbacks, it is therefore a purpose of the present invention to provide an improved armrest for a vehicle seat which permits for reducing the downward roation rate of the armrest body to the above-defined non-use position, thereby offering a moderate, pleasant movement of the armrest and avoiding a serious collision between the armrest body and adajcent part of the vehicle.

In accmplishment of the purpose, the armrest according to the present invention comprises an armrest body which is pivotally attached to a lateral surface of a seat back of the seat, such that the armrest body is displaceable between the non-use position it stands generally along the vertical direction of the lateral surface of the seat back and the use position where it extends generally horizontally from the seat back; a spring means provided at the pivot point of the armrest body, which spring means is for urging the armrest body towards one of said non-use and use positions, to thereby retain the armrest body there; and a buffer means provided within the armrest body, which acts to reduce a rotation rate at which the armrest body is rotated downwardly to the use position, in a moderate, gradual way.

Accordingly, when rotating downwardly the armrest body towards the use position, the armrest, which is urged to rotate quickly under the force of the spring means, is applied a counter force from the buffer means, in order that the armrest body is rotated downwardly at a reduced rotation rate and shows a moderate rotation about the pivot. Thus, there is eliminated such noize and collision problem as found in the aforementioned prior art.

In one aspect of the invention, the buffer means comprises an air damper, a guide pulley and a wire, with such a construction that the air damper is provided at the inner surface of the armrest body, including a cylinder, a compression spring disposed in the cylinder and a piston which is to be extendable from and widthdrawn into the cylinder, and that the guide pulley is fixed on the pivot shaft of the armrest body, with the wire being extended between the guide pulley and the free end of the piston. With such structure, with the downward rotation of the armrest body, the piston is pulled by the wire, thereby procuding a counter force against the urging force of the spring means via the compression spring.

In another aspect of the invention, there is a ratchet mechanism for permitting fine height adjustment of the armrest body at that use position.

DETAILED DESCRIPTION OF PREFERRED EMBODIMENT OF THE INVENTION

Figure 1:
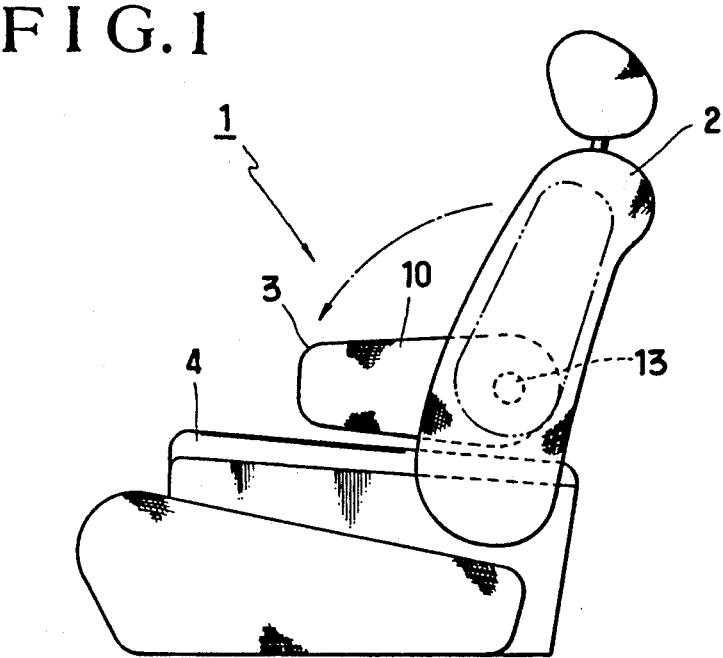
FIG. 1 is a side view of a vehicle seat to which is applied an armrest device in accordance with the present.

Referring to FIGS. 1 though 4, is illustrative one preferred embodiment of an armrest in accordance with the present invention.

FIG. 1 is a schematic diagram showing the armrest device (3) to be mounted in a seat (1). The seat (1) is a front one in a vehicle such as an automobile, with a console box (4) being provided at the lateral side of the seat (1), at the middle area between a pair of front seats including such seat (1).

Viewing now FIGS. 2 to 4, designation (10) denotes an armrest body associated with the armrest device (3), which is formed by putting together the upper body section (11) and lower body section (12), thus providing an inner hollow within the two body sections (11)(12) to accomodate constituent parts components therein as will be described later.

Figure 2:
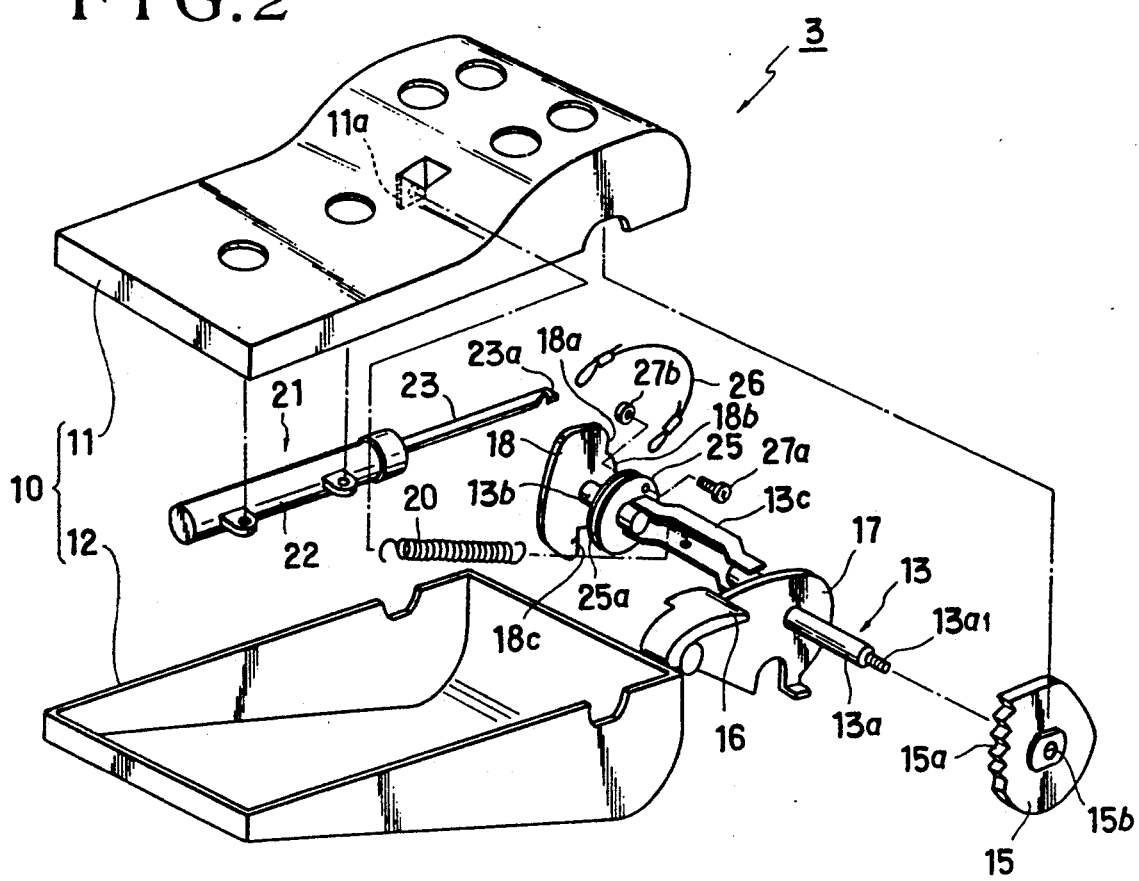
FIG. 2 is a partially schematic, perspective vie of the armrest device, showing the disassembled state thereof.

Referring to FIG. 2, a shaft (13) is arranged at the rearward end part of the armrest body (10) such as to extend transversely thereof. The shaft (13) is at its one end part fixed on one lateral side of the seat back (2) of the seat (1), such that the armrest body (10) is free to be rotated about the shaft (13). The shaft (13) comprises a pair of first and second shaft sections (13a)(13b) each having a circular cross-section and an intermediate member (13c) having a channel cross-section in a configuration as shown in FIGS. 2 and 3. The first and second shaft sections (13a)(13b) are each connected to the respective both ends of the intermediate member (13c).

Figure 3:
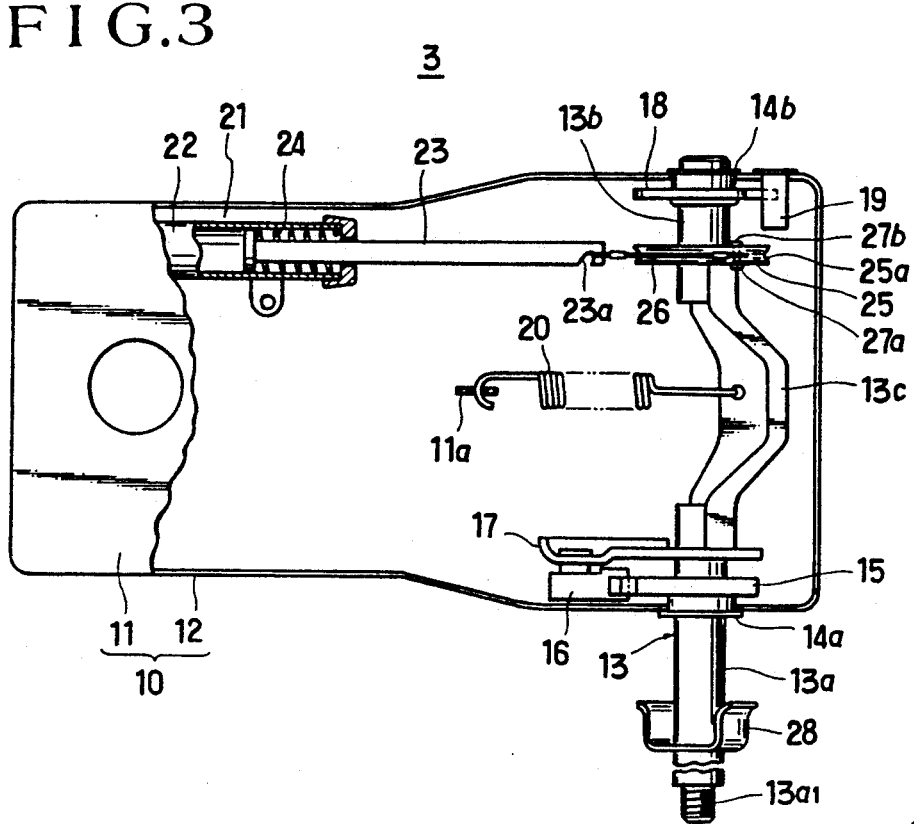
FIG. 3 is a partly broken plan view of the same armrest device.

As can be seen from FIG. 3, the armrest body (10) is rotatably supported on those two shaft sections (13a)(13b) via a pair of collars (14a)(14b), respecttively.

Interiorly of the armrest body (10), to the first shaft section (13a) of the shaft (13), is secured a support plate (17) having on its forward end a pawl member (16), whereas, to the second shaft section (13b) thereof, is secured a guide plate (18) having, defined thereon, a first limit edge (18a), an intermediate guide edge (18b), and a second limit edge (18c).

Further, interiorly of the armrest body (10), a ratchet (15) is fixed at its one lateral surface to one inner lateral wall of the armrest body (10), with its center hole (15b) being rotatably supported on the first shaft section (13a), whereas, to the other opposite inner lateral wall of the body (10), is fastened fixedly a guide pin (19) which is in a slidable contact with the guide plate (18), as can be seen from FIG. 2. The ratchet (15) is formed at its forward edge part with a plurality of teeth (15a). Into one of those teeth (15a), the pawl member (16) is to be engaged, for a purpose to be stated later. Here, it should be noted that the teeth (15a) of the ratchet (15) are directed in a downward direction, while the pawl member (16) is oriented in an upward direction, with a view to permitting a fine adjustment of the armrest body (10) in a vertical direction when the armrest body (10) is located at the non-use position to be explanied later.

The guiding edge areas of the guide plate (18), which comprises the first limit edge (18a), intermediate guide edge (18b) and second limit edge (18c) as mentioned above, define an upper limit and a lower limit within which the armrest body (10) is rotatable about the shaft (13). Namely, when rotating the armrest body (10) towards an extreme upward degree, the guide pin (19) in the armrest body (10) is brought to contact with the second limit edge (18c), thereby limiting the upward rotation of the armrest body (10), while on the other hand, when the armrest body (10) is rotated towards an extreme downward degree, the guide in (19) is brought to contact with the first limit edge (18a), thereby limiting the downward rotation of the same.

It shoud be understood that, similarly to the previously stated prior-art armrest, the armrest body (10) is rotatatively displaceable between a use position and a non-use position, the use position being defined at the location indicated by the solid line in FIG. 1 where the armrest body (1) lies generally horizontally, permitting an occupant on the seat (1) to rest his or her arm thereon, and the non-use position being defined at the location indicated by the two-dot chain line in FIG. 1 where the armrest body (1) erects generally upright along the lateral wall of the seat back (2), and that the foregoing first limit edge (18a) serves to cause the armrest body (10) to stop at the non-use position, whereas the foregoing second limit edge (18c) serves to cause the same to sotp at the use position. The former limit effect is realized by virtue of the guide pin (19) being brought to abutment against the first limit edge (18a) with the upward rotation of the armrest body (10), and the latter effect is by virtue of the guide pin (19) being, on the contoray, abutted against the second limit edge (18c).

The upper body section (11) is formed with a dependent lug (11a), generally at the central point thereof, which is formed by being cut and bent down from the section (11) to project inwardly thereof.

A return coil spring (20) is extended between such lug (11a) at the upper body section (11) and intermediate member (13c) of the shaft (13), such that one end of the spring (20) is connected with the lug (11a) and the other end of the same is connected wtih the intermediate member (13c).

A guide pulley (25) is fixed on the first shaft section (13a) of the shaft (13) such that the pulley (25) is disposed inwardly thereon relative to the guide plate (18), as shown. The guide pulley (25) is formed with a recessed groove (25a) circumferentially thereof, in which groove (25a), one end of an actuator wire (26) is fastened to a screw (27a) which is penetrated through the upper area of the pulley (25) and fixed by a nut (27b), whereupon the wire (26) is, at that one end, connected firmly to the upper part of circumference of the guide pulley, in such manner that such connected point, where the wire (26) is connected to the pulley (25), is disposed generally at the rearward side of the pulley (25), as illustrated.

An air damper (21) is also provided within the armrest body (10), which functions as a buffer means for reducing the rotaion rate of the armrest body (10) which is tended to rapidly rotated by the spring (20), as will be stated later.

The air damper (21) comprises a cylinder (22) and a piston (23). The piston (23) is slidably inserted in the cylinder (22), with the arrangement that one end of the piston (23), disposed within the cylinder, is normally biased by a compression coil spring (24) in a direction inwardly of the cylinder (22). This is shown best from FIG. 3, wherein such coil spring (24) is depicted as being interposed between the end of the cylinder (22) and the slider part of the piston (23), acting to effort to cause the piston (23) to be withdrawn into the cylinder (22). The thus-formed damper (21) is firmly attached to the inner surface of the upper body section (11) of the armrest body (10), such that the free end of the piston (23), which terminates in a hook part (23a), extends towards the guide pulley (25). Then, as best seen from FIG. 3, the free end of wire (26) is connected to the hook part (23a) of the piston (23), whereby the air damper (21) is to be acted upon the armrest body (10) for a buffer purpose against the rapid upper and lower rotation of the armrest body (10) as will be specified.

Figure 4:
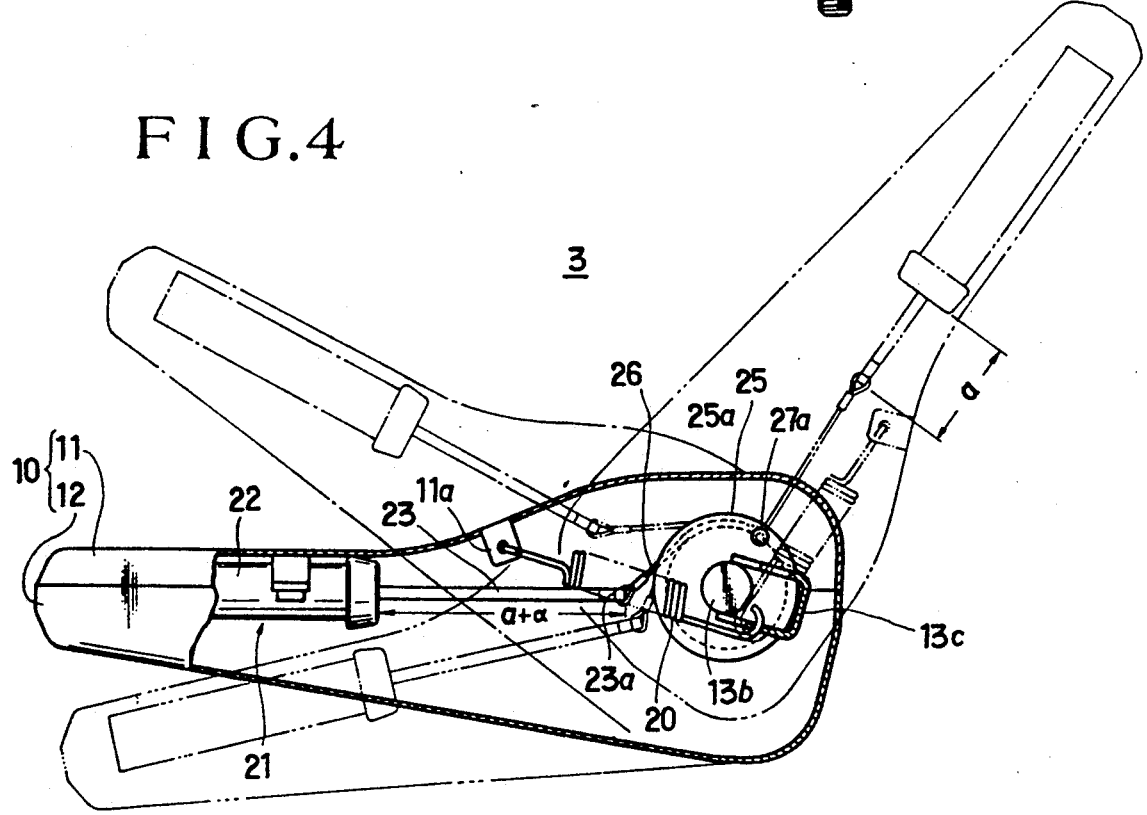
FIG. 4 is a side elevation schematic view of the armrest device, which explanatorily shows the vertical rotation of the same.

As understandable from FIG. 4, the wire (26) is of a proper length such as to be extended away from the guide pulley (25) and lie along the groove (25a) thereof, to such an extent that the piston (23) of the air damper (22) may thereby be pulled outwardly at a moderate, slow rate, hence adding to a soft buffer action of the damper (22) against the rapid vertical movement of the armrest body (10) under the force of the spring (20) relative to a dead point.

It is noted that the right-side shaft section (13a) of the shaft (13), as viewed from FIGS. 2 and 3, terminates in a screw end portion (13a1) which is adapted to be secured in a mating female threaded hole of a seat back frame (not shown) within the seat back (2), and that, on the same shaft section (13a), is provided a stopper disc (28) at a point inwardly in respect to the screw end portion (13a1), the stopper disc (28) being adapted to be attached to the lateral surface of the seat back.

The armrest body (10) is covered over its entire surfaces with a trim cover assembly or the like, as can be assumed from FIG. 1.

Now, hereinafter, a description will be made in regard to the operation of the above-constructed arm rest device (3).

Firstly, when the armrest body (10) is in non-use state, it is located at the non-use position where it stands generally upright along the vertical direction of the seat back (2), as shown by the two-dot chain line in FIG. 1, which is indicative of the armrest body (10) being stored, not for permitting receipt of an occupant's arm.

Under such state, as in FIG. 4, the return spring (20) urges completely the armrest body (10) to rotate rearwardly and is retained at the above-described upright non-use posture, as indicated by the two-dot chain line in the FIG. 4, and it is be understood that the guide pin (19) integral with the armrest body (10) is thereby retained in abutment against the second limit edge (18c), although not depicted in the drawings but as assumable from FIG. 3, which therefore limits the backward rotation of the armrest body (10) in order for the same to be stopped at the foregoing predetermined non-use position. At this point, it is further seen that the actuator wire (26) is fully stretched over its entire length by the piston (23) of the air damper (22), in the axial longitudinal direction of the piston (23), and thus, the piston (23) is shortened its projecting length relative to the cylinder (22) under the elastic expanding force of the compression coil spring (24) in the cylinder (22), whereupon the piston projecting length is now set at a degree expressed by the designation "a" as shown in FIG. 4.

Then, when it is desired to use the armrest body (10), an occupant on the seat (1) should forcibly push the armrest (10), which is in the foregoing non-use position, in a forward direction with respect to the seat back (2), using a force enough to overcome the biasing force of the return spring (20), causing the forward rotation of the armrest body (10) down towards the use position. With this rotation of the armrest body (10), the piston (23) is being pulled by the fixed wire (26) to extend its projecting length, overcoming the force of the compression spring (24), from the cylinder (22), while the wire (26) is wound along the upper peripheral part of the groove (25a) of the guide pulley (25), as a result of which, the wire (26) is stretched along a tangential direction with the circumference of the pulley (25), as indicated by the two-dot chain line in FIG. 4. With this way, the piston (23) is pulled in a gradual or progressive way out of the cylinder (22). In this respect, according to the embodiment shown, the wire (26) assumes an angle of 97 degrees from the vertically stretched point thereof indicated by the two-dot chain line in the same FIG. 4. At this point, the return spring (20) is extremely pulled, and after the armrest body (10) is rotated, downwardly, beyond the 97-degree angle, the return spring (20) contracts itself resiliently, forcing the armrest body (10) to rotate further downwardly under the additional gravity. This turning point of the armrest body (10) is referred to as the "dead point", as previously mentioned in the prior art description of this text. In relation to the dead point, the return spring (20) is changed its state into one of expanding and contracing states.

Then, as the armrest (10) continues to be rotated downwardly, below the dead point, FIG. 4 also shows, by the solid line, the piston (23) to be in the state of being extended at a longest degree, as expressed with "a +alpha", overcoming the force of the compression spring (24).

The armrest body (10) finally reaches the lowest point as indicated by the three-dot chain line in the FIG. 4, in which instance, the guide pin (19) is contacted with the second limit edge (18c), preventing the armrest body (10) against futher downward rotation.

The armrest (10) finally reaches the lowest point as indicated by the three-dot chain line in the FIG. 4, in which instance, the guide pin (19) is contacted with the second limit edge (18c), preventing the armrest body (10) against further downward rotation.

Accordingly, it is seen that the above-stated downward rotation of the armrest body (10) causes drawing of the piston (23) out of the cylinder (21) through the wire (26) to thereby create an increased repercussive force of the compression spring (24) within the cylinder (21), whereby the rapid downward movement of the armrest body (10) being caused by the return spring (20) is gradually reduced in accordance as the force of the spring (24) becomes greater. Thus, the spring (24) acts as an elastic buffer for rendering moderate the rotation rate of the armrest body (10).

When the armrest (10) reaches the lowest point at the non-use position, the teeth (15a) of the ratchet (15) gets out of egagement with the pawl (16) and is displaced in a downward direction away from the ratchet (15).

If an adjustment is desired for attaining a desired level of the armrest body (10) at that use position, the armrest body (10) is raised a small distance, so as to bring the teeth (15a) of the ratchet (15) into a mesh engagement relation with the pawl (16), and retained there under the contracting force of the return spring (20). Then, with futher upward rotation of the armrest body (10), an occupant on the seat may bring the ratchet (15) to mesh with the pawl (16), and adjust the height of the armrest body (10) to set at his or her desired level.

Conversely, when it is desired to displace the armrest body (10) from the use position to the non-use poisition, the occupant should force the armrest body (10) to rotate upwardly, overcoming the contractting force of the return spring (20), while causing the teeth (15a) of the ratchet (15) to be disengaged upwardly from the pawl (15), until the armrest body (10) moves over the dead point. Thereafter, the body (10) will automatically be rotated upwards to the non-use position, rapidly, as indicated by the two-dot chain line in FIG. 4. Here, it is noted that the wire (26), which is wound upon the pulley (25), laying along the tangential direction therewith, is then stretched rectilinearly in a coaxial relation with the piston (23), with the result that the length of the wire (26) becomes greater with respect to the piston (23) and the compression spring (24) in the cylinder (22) is expanded, reducing its counter force against the rotation of the armrest body (10). For this reason, the upward rotation of the armrest body (10) above the dead point is made quick towards the non-use position.

From the descriptions above, it is to be appreciated that, in accordance with the present invention, the downward rotation of the armrest body (10) towards the use position is reduced in rate due to the progressive counter force produced by the air damper (21), pulley (25) and wire (26), which avoids a serious collision of the armrest body (10) against the console box (4) or other adjacent part of the vehicle. Thus, there is eliminated such prior-art problem as an unpleasant noise and damage associated with that strong contact of the armrest body with other object in the vehilce. Further, the armrest body (10) is rotated downwardly at a gradually reduced rotation rate towards the use position, which gives an elegant impression to the operative motion of the armrest body (10). Still further, the ratchet mechanism (15, 16) allows a fine height adjustment of the armrest body (10) at the use position. Advantageously, the armrest body (10) is semi-automatically returned to the non-use position above the dead point, without adding a further force thereto, thus providing an improved operationability thereof.

While having described the invention as above, it should be understood that it is not limited to the illustrated embodiment, but any other modification, replacement and addition will structurally be possible without departing from the scope and spirit of the appended claims. For example, the air damper (21) may be replaced by other suitable damper means, and the configure of the armrest body may be varied for a desired outer aesthetic appearance.

What is claimed is:

1. An armrest for a vehicle seat, comprising:

an armrest body which has a hollow interior therein and which is pivotally attached to a lateral surface of a seat back of said seat, such that said armrest body is displaceable between a non-use position where said armrest body stands generally upright along a vertical direction of said lateral surface of said seat back and a use position where said armrest body extends generally horizontally from said seat back, said armrest body being rotatably supported on a shaft fixed to said seat back, the shaft extending through the hollow interior of the armrest body;

a spring means provided at a pivot point of said armrest body, said spring means being adapted for urging said armrest body towards one of said non-use and use position, to thereby retain said armrest body there; and a damper means provided between the shaft and the armrest body, said damper means providing a counter force against the urging force of the spring means which urges the armrest body towards the use position, thereby rendering moderate or slow displacement of the armrest body to the use position.

2. The armrest as defined in claim 1, wherein said armrest body is formed in a box shape, comprising said frame so formed as to define a hollow therein, and wherein, in said hollow, there are arranged said spring means and said damper means.

3. The armrest as defined in claim 1, wherein said damper means comprises an air damper.

4. The armrest as defined in claim 3, wherein said air damper comprises a cylinder, a piston, and a compression coil spring, such that said compression coil spring is so disposed within the cylinder as to be arranged between one end of said cylinder and one end of said piston, to thereby give an elastic force against said piston, so that other free end of said piston may be withdrawn into or extended out of said cylinder resiliently in accordance with an external force being applied to said other free end of said piston, and wherein an arrangement is provided for applying said elastic force of said air damper as a counter force against a downward rotation of said armrest body.

5. The armrest as defined in claim 4, wherein said arrangement comprises a pulley and a wire, such that said pulley is fixed at a rotation point of said armrest and said wire is extended between said free end of said piston associated with said air damper and said pulley.

6. The armrest as defined in claim 1, wherein said spring means comprises a return spring of a pulling coil spring type which is extended between an inner wall of said armrest body.

* * * * *